(12) United States Patent
Chipchase (10) Patent No.: US 7,752,451 B2
(45) Date of Patent: Jul. 6, 2010

(54) SYSTEM AND METHOD FOR VIRTUAL ENTITY ACCESS

(76) Inventor: Jan Chipchase, 2-20-4, 601 Shuwa Shiunezuike Residence, Mrguro Honcho, Mrguro Ku, Tokyo (JP) 157-0002

( * ) Notice: Subject to any disclaimer, the term of this patent is extended or adjusted under 35 U.S.C. 154(b) by 1473 days.

(21) Appl. No.: 10/718,822

(22) Filed: Nov. 21, 2003

(65) Prior Publication Data

US 2005/0216367 A1 Sep. 29, 2005

(51) Int. Cl.
*H04L 9/32* (2006.01)
*H04L 9/10* (2006.01)

(52) U.S. Cl. .................. 713/185; 40/606.04; 340/5.9; 340/5.91; 340/5.92

(58) Field of Classification Search .............. 713/183, 713/185; 434/82, 100, 99, 88, 386; 40/606.04; 340/5.9, 5.91, 5.92; 717/175, 169
See application file for complete search history.

(56) References Cited

U.S. PATENT DOCUMENTS

| | | | |
|---|---|---|---|
| 4,614,366 A * | 9/1986 | North et al. ............... | 283/70 |
| 5,606,497 A | 2/1997 | Cramer et al. | |
| 6,011,841 A | 1/2000 | Isono | |
| 6,065,969 A * | 5/2000 | Rifkin et al. ............ | 434/100 |
| 6,363,137 B1 | 3/2002 | Nakao et al. | |
| 6,424,704 B1 | 7/2002 | Lee | |
| 7,343,329 B1 * | 3/2008 | Sharp ....................... | 705/27 |
| 2002/0002470 A1 | 1/2002 | Arai | |
| 2002/0062289 A1 | 5/2002 | Kondo | |
| 2002/0077981 A1 | 6/2002 | Takatori et al. | |
| 2002/0193047 A1 * | 12/2002 | Weston ..................... | 446/484 |

FOREIGN PATENT DOCUMENTS

| | | |
|---|---|---|
| DE | 004331432 A1 | 3/1995 |
| WO | WO 01/20844 A1 | 3/2001 |
| WO | WO 01/50224 A2 | 7/2001 |
| WO | WO 01/95267 A1 | 12/2001 |

OTHER PUBLICATIONS

Want, Roy et al. "Bridging Physical and Virtual Worlds with Electronic Tags." ACM(1999):370-377.*
Cisco Systems' Universal Access Serviers PCNetter, vol. 11, No. 4, ISSN:0893-8075.
http://www.nttdocomo.com/corebiz/imode/alliances/cmode.html, downloaded on Dec. 5, 2003.
http://www.m-travel.com/10904.shtml, downloaded on Dec. 5, 2003.
U.S. Appl. No. 10/339,799, filed Jan. 10, 2003, Vesikivi et al.

* cited by examiner

*Primary Examiner*—Jung Kim
*Assistant Examiner*—Venkat Perungavoor (57) ABSTRACT

Systems and methods applicable, for example, in allowing a user to come to possess a physical entity that allows for the receipt, use, access, and/or the like of a virtual entity (e.g., a media item, software, a service, data, and/or the like). A number of form factors for physical entities might be available. Available form factors might include, for example, images, jewelry, toys, clothing, iron-ons, straps, cards, nail treatments, temporary tattoos, stickers, figurines, and/or the like. Various attributes of a physical entity might, for example, be definable and/or selectable by a user.

44 Claims, 6 Drawing Sheets

SYSTEM AND METHOD FOR VIRTUAL ENTITY ACCESS

FIELD OF THE INVENTION

This invention relates to systems and methods for entity access.

BACKGROUND INFORMATION

In recent years, there has been an increase in the use media items, software, services, and the like by users of computers (e.g., user devices).

Many users have come to prefer such media items over more conventional media forms such as records, audio tapes, video tapes, CDs, and DVDs. Moreover, many users have come to rely on such software and services for various purposes in their lives such as, for example, organization, productivity, personal finance, and entertainment.

Accordingly, there may be interest in technologies that facilitate such use of computers.

SUMMARY OF THE INVENTION

According to embodiments of the present invention, there are provided systems and methods applicable, for example, in allowing a user to come to possess a physical entity that allows for the receipt, use, access, and/or the like of a virtual entity (e.g., a media item, software, a service, data, and/or the like).

A number of form factors for physical entities might, in various embodiments, be available. Available form factors might include, for example, images, jewelry, toys, clothing, iron-ons, straps, cards, nail treatments, temporary tattoos, stickers, figurines, and/or the like. Various attributes of a physical entity might, for example, be definable and/or selectable by a user.

DETAILED DESCRIPTION OF THE INVENTION

General Operation

According to embodiments of the present invention, there are provided systems and methods applicable, for example, in allowing a user to come to possess a physical entity (PE) that allows for the receipt, use, access, and/or the like of a virtual entity (VE). A VE might, for example, be a media item, software, a service (e.g., a web service), data, and/or the like.

A number of form factors for PEs might, in various embodiments, be available. Available form factors might include, for example, images, jewelry, toys, clothing, iron-ons, straps (e.g., user device straps), cards (e.g., greeting cards, post cards, and/or business cards), nail treatments, temporary tattoos, stickers, figurines, and/or the like.

Integrated in a PE could, in various embodiments, be a storage element. The storage element could be, for example, be a radio-frequency identification tag (RFID tag), an iButton, a printed code (e.g., a barcode or a dot pattern), a magnetic stripe, a smart-card element, an optical storage element (e.g., one readable and/or writable by a CD or DVD drive), and/or the like. Held in the storage element could, for example, be one or more VEs, data employable in receiving, using, and/or accessing one or more VEs, and/or the like.

A user wishing to receive, use, access, and/or the like a VE might, in various embodiments, employ a corresponding PE by, for instance, allowing a user device (e.g., a wireless node or other computer) to read from and/or write to the storage element integrated in the PE. Accordingly, for example, the PE could be disposed in communication with an appropriate interface (e.g., an RFID interface in the case where the storage element is an RFID tag) associated with the device. The device could then, in various embodiments, employ contents of the storage element in allowing for the receipt, use, access, and/or the like of the VE.

According to various embodiments of the present invention, various attributes of a PE could be definable and/or selectable by a user.

Various aspects of the present invention will now be discussed in greater detail.

Virtual Entity and Physical Entity Selection

According to various embodiments of the prevent invention, a user can interact with a computerized vending machine (CVM) capable of vending PEs that allow for the receipt, use, access, and/or the like of VEs. Such interaction could be provided for in a number of ways.

For example, the CVM could provide a screen (e.g., a touch-sensitive screen), buttons, a keyboard, a keypad, sound output, sound input, and/or the like whereby users could interact with the CVM. For instance, one or more such elements could be employed by the CVM in providing a graphical user interface (GUI), voice, and/or other interface allowing for such interaction.

As another example, communications could be establishable between the CVM and user devices whereby the devices could provide to their users GUIs and/or other interfaces that would allow for such interaction. Such communications could, for example, employ Bluetooth, Infrared Data Association (IrDA), Universal Mobile Telecommunications System (UMTS), General Packet Radio Service (GPRS), 802.11b, 802.11g, ZigBee, a wired connection, and/or the like.

In various embodiments, one or more software modules could be presented to a user device to allow for such interaction. It is noted that, alternately or additionally, in various embodiments, one or more software modules could be present on a user device to allow for the receipt, use, access, and/or the like of VEs. Software modules for such interaction and/or such use, receipt, access, and/or the like could be present on user devices due to a number of operations.

For example, such modules could be dispatched from CVMs, servers, and/or the like to user devices. Such dispatch might, for example, be performed using Object Exchange Object Push Profile (OBEX OPP), file transfer protocol (FTP), hypertext transfer protocol (HTTP), short message service (SMS), multimedia messaging service (MMS), and/or the like. As another example, such modules could be loaded on user devices from media. As yet another example, such modules could be placed on user devices at time of manufacture, at customer services kiosks, at retail locations, and/or the like.

Software modules allowing for such interaction might, for instance, act to allow a user device to present information and/or the like to its user in accordance with specifications and/or the like provided by a CVM, and to allow the user device to present to the CVM input and/or the like provided by the user. In various embodiments, a GUI and/or other interface could be employed in such operations. Dispatch of data corresponding to such specifications, input, and/or the like could be exchanged between the user device and the CVM in a number of ways. For example, simple object access protocol (SOAP), remote method invocation (RMI), Java messaging service (JMS), remote procedure call (RPC), and/or the like might be employed.

Figure 1:
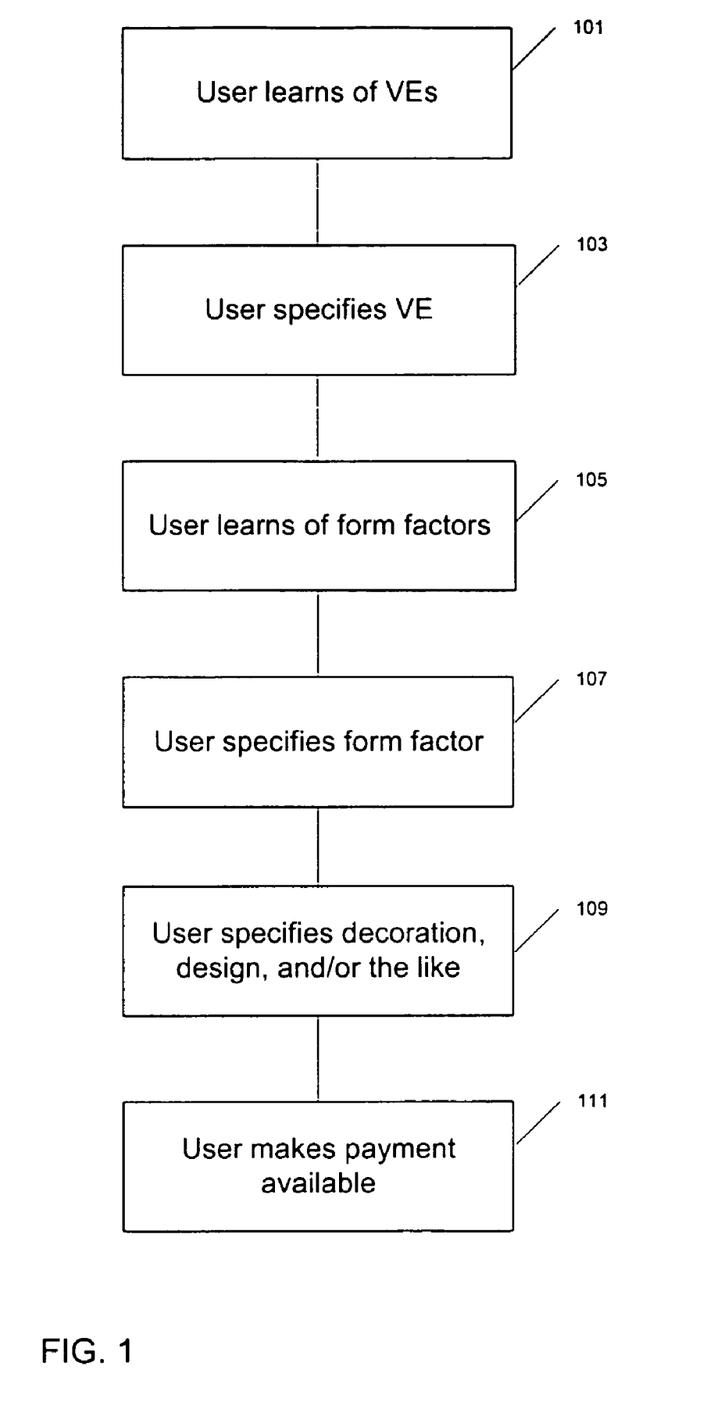
FIG. 1 is a diagram depicting exemplary steps involved in virtual entity and physical entity selection according to embodiments of the present invention.

With respect to FIG. 1 it is noted that, according to various embodiments of the present invention, a user could employ interaction of the sort just discussed, to learn of available VEs (step 101) and/or to select a VE for receipt, use, access, and/or the like (step 103). It is noted that, in various embodiments, as an alternative to or in addition to being able to learn of available VEs, a user could act provide to a CVM information regarding one or more VEs. For example, a user might be able to provide links (e.g., hyperlinks) to VEs. Accordingly, for instance, a user could act, perhaps via a provided GUI or the like, to provide a hyperlink to a VE for receipt, use, access, and/or the like.

Accordingly, for instance, a user could, via such GUI or other interface, be presented various text, images, previews, and/or the like corresponding to available VEs, and be allowed to select a VE of interest. Although for ease of explanation selection of a single VE and association of a PE with only one VE is discussed, it will be understood that, in various embodiments, multiple VEs may be selected and/or multiple VEs may be associated with a single PE.

Having selected a VE of interest, the user could, in various embodiment, act to specify a PE that allows for the receipt, use, access, and/or the like of the VE. Such functionality could be implemented in a number of ways. For example, in various embodiments the user could be able to employ a provided GUI and/or the like to learn of the various form factors available for PEs (step 105). Accordingly the user might, for instance, be presented with text, pictures, information, and/or the like corresponding to the available form factors. As alluded to above, such forms could include, for example, include dolls, figurines, stickers, business cards, toys, temporary tattoos, nail treatments, postcards, phone straps, jewelry, balls, sports novelties, clothing (e.g., shirts, pants, jackets, hats socks, skirts, shoes, dresses, and/or the like, images, food containers, tickets (e.g., movie tickets, a theater tickets, a concert tickets, a transportation tickets, and/or the like), and/or the like.

Having learned of various VE form factors, the user could, perhaps via the provided GUI and/or the like, select one for employment (step 107). Having selected a VE form factor the user could, in various embodiments, be able to choose whether or not to specify decoration, design, and/or the like for the PE (step 109). According to various embodiments, a user could be able to select from predefined decorations, designs, and/or the like. Such could include, for example, images, graphics, and/or the like corresponding and/or not corresponding to brands, sporting teams, genres, themes, locations, and/or the like.

In various embodiments, the predefined decorations, designs, and/or the like offered by a CVM could correlate to the location of the CVM, the owner of the CVM, and/or the like. For example, decorations, designs, and/or the like relating to a sporting teams might be offered by a CVM located at that team's arena. As another example, a CVM located at a store could offer decorations, designs, and/or the like relating to brands sold by the store. As still another example, a CVM located at a movie theater could offer decorations, designs, and/or the like relating to movies playing there.

As an alterative to and/or in addition to selecting predefined decorations, designs, and/or the like, the user could, for example, be able to modify a predefined decoration design and/or the like, and/or be able to create, supply, and/or the like a decoration, design, and/or the like.

Accordingly, for instance, in various embodiments a user could be able to employ a provided GUI or other interface to modify, create, and/or supply a decoration, design, and/or the like. A user could, in various embodiments, be able to transfer data corresponding to one or more elements from her device for employment and/or incorporation into a decoration, design, and/or the like. For example, the user could upload an image, graphic, design, and/or the like stored on a device. Such a device might, for instance, be a user device in proximity of the CVM, a remote server, and/or the like. Transfer could, for example, be performed in a manner analogous to that discussed above.

According to various embodiments, a CVM could offer decorations, designs, and/or the like that involved input from the user, her surroundings, the surroundings of the CVM, and/or the like. For example, a CVM could offer to include a photograph taken by the CVM as a decoration, design, and/or the like. Accordingly, for example, the CVM could instruct the user and/or her companions to pose for the photo, could display, perhaps via a provided GUI or the like, the captured photo for the user's approval, and, with the user's approval, appropriate employ the photo for use as a decoration, design, and/or the like. In various embodiments, image capture could be performed by other than a CVM. For example, image capture might be performed by a image capture device incorporated in a user's device. The captured image might then, for example, be transferred to the CVM in a manner analogous to that discussed above.

According to various embodiments of the present invention, fees could be collected from users receiving PEs and/or the ability to receive, use, access and/or the like VEs. For example, a user that has, as alluded to above, indicated a desire to receive, use, access and/or the like a VE, and/or who has selected a PE, could be required to make payment available before she would receive the PE and/or come to receive, use, access and/or the like the VE (step 111).

Accordingly a user might, for instance, be instructed, perhaps via a provided GUI or other interface, to insert coins into the CVM, to insert a credit card or banking card into the CVM, to execute payment using a user device and/or the like. Implementation of such functionality could, for example, involve the use of coin and/or bill recognition equipment, credit card and/or banking card readers, connectivity between the CVM and a user device (e.g., via Bluetooth, 802.11b, 802.11g, GPRS, UMTS, IrDA, wired connection, and/or the like), communication with banking computers, and/or the like. In various embodiments, in the case where a payment method failed (e.g., for insufficient funds), the user attempting to make payment might, for instance, be instructed to try the attempted payment again and/or to try another payment. In various embodiments, where appropriate funds could not be secured, processing of the user's request could, for example, halt. In various embodiments the user might, perhaps via a GUI or other interface, be apprised of the situation.

It is noted that, in various embodiments, a user could act to pay for a VE, a corresponding PE, and/or both. Moreover, for example, the VE corresponding to a PE could be considered to be free with submission of funds for the PE, and/or a PE corresponding to a VE could be considered to be free with submission of funds for the VE.

As noted above, in various embodiments, a PE could be a food container. Further to this it is noted that, in various embodiments, a CVM could vend food in such containers. As a specific example, purchase of popcorn from a CVM could result in the user receiving the popcorn in a container that was a PE corresponding to a VE.

As another example it is noted that, as alluded to above, in various embodiments a PE could be a ticket. For instance, purchase of such a ticket from a CVM could result in the user receiving a ticket that was a PE corresponding to a VE, the VE perhaps being related to that for which the ticket provided access and/or the like. As a specific example, where the ticket was to a concert, the VE corresponding to the ticket PE might be a video clip corresponding to the performers in the concert. It is noted that, in various embodiments, funds might not be collected with respect to all and/or various VEs and/or PEs.

Virtual Entity and Physical Entity Provision

According to various embodiments of the present invention, various operations may be performed to provide a PE to a user and/or to allow the user to receive, use, access, and/or the like a VE to which the PE corresponds.

Figure 2:
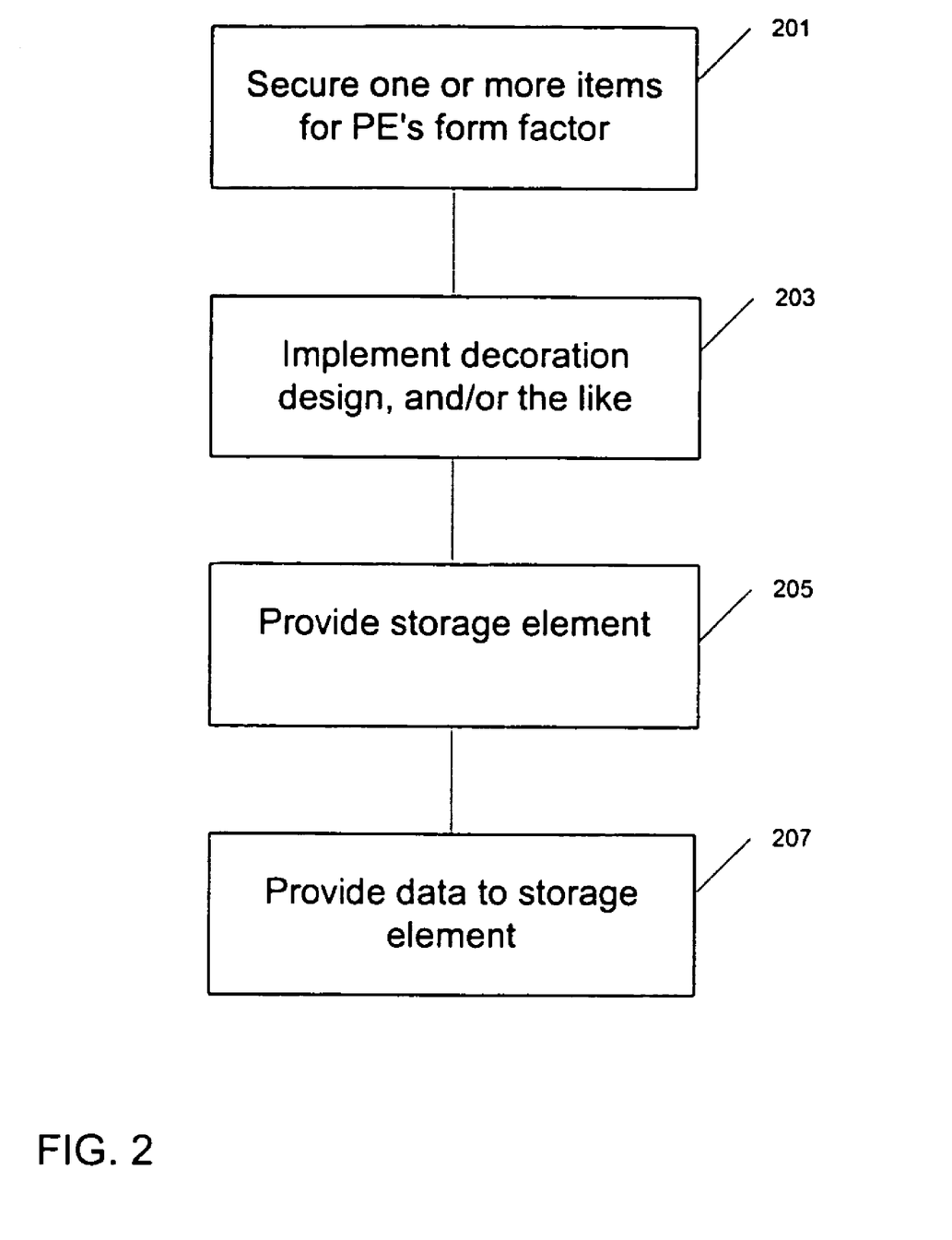
FIG. 2 is a diagram depicting exemplary steps involved in virtual entity and physical entity provision according to embodiments of the present invention.

With respect to FIG. 2 it is noted that, for instance, a CVM could act to secure one or more items for a PE's form factor (step 201). Such functionality could be implemented in a number of ways. For example, a CVM could maintain a stockpile of items corresponding to various form factors available for PEs. Accordingly, the CVM could act to select from the stockpile one or more items and/or the like for the form factor corresponding to the user's selection. As another example, the CVM could, in various embodiments, act to create, on-the-fly, one or more items for the form factor corresponding to the user's selection. For example, a printing apparatus (e.g., an inkjet or laser printing apparatus) could be employed, a stitching machine and/or sewing machine could be employed, a 3-D printer could be employed, and/or the like.

As yet another example, in various embodiments, provision of a PE could involve a user providing one or more items and/or the like to the CVM. For example, in the case where the PE form factor was a nail treatment, provision of the PE could involve the user's nail. Accordingly, in such embodiments, the CVM might, for instance, act, perhaps via a provided GUI or other interface, to request that a user insert her fingernail into an appropriate opening on the CVM. As another example, a user might be able to insert a possessed object (e.g., a card) to be used in the creation of a PE.

As noted above, in various embodiments a user could specify decoration, design, and/or the like for a VE. Accordingly, where a user made such specification, the CVM could, for instance, act to implement the decoration, design, and/or the like (step 203). Such functionality could be implemented in a number of ways.

For example, the CVM could act to apply specified decoration, design, and/or the like to one or more items selected from its stockpile and/or provided by a user. Such application could be performed in a number of ways. For example, stickers or the like held by the machine could be applied, a printing apparatus could be employed, a stitching matching and/or sewing machine could be employed, a 3-D printer could be employed, and/or the like. In, for example, the case where the PE was to involve a user's nail, the CVM could, for instance, act to use inkjet-based and/or other nail-painting apparatus and/or the like to apply specified decoration, design, and/or the like.

According to various embodiments, items held in a CVM stockpile and/or provided by a user could already possess integrated storage elements. In the case where an item employed in the provision of a PE already possesses an integrated storage element, a CVM could act to provide various data to the storage element.

In various embodiments, in the case where no item employed in the provision of a PE already possesses an integrated storage element, a CVM could act so that the PE being provisioned would possess a storage element (step 205). Such functionality could be implemented in a number of ways. For example, the CVM could possess a stockpile of storage elements and act to attach an appropriate storage element to the PE being provisioned. Such functionality could be implemented in a number of ways. For example, an adhesive could be employed in attaching the storage element.

Where attachment of a storage element is required, such placement could, depending on the embodiment, happen before and/or after any application of decoration, design, and/or the like. Accordingly, for instance, in various embodiments where the PE is a nail treatment, a storage element could be attached to a user's nail before decoration, design, and/or the like is applied. The storage element might, for instance, by applied to the user's nail by direct action of a CVM (e.g., by an integrated mechanical device). Alternately or additionally, a CVM might vend the storage element to the user and, perhaps via a GUI or other interface, ask her to apply the storage element to her nail and then, if appropriate, ask her to place her nail in the CVM for application of decoration, design, and/or the like.

It is noted that, in various embodiments, a storage element could be encapsulated to, for example, protect the storage element and/or to make it unharmful and/or less harmful if swallowed. Moreover, it is noted that, in various embodiments, a CVM might act to provide a storage element separately from a PE being provisioned instead of and/or in addition to attaching thereto as just described. For example, a CVM could act to vend a storage element separately, perhaps providing the user to whom it is vended with instructions on how to apply it to the provisioned PE. As a specific example, the storage element might be integrated into an adhesive gel provided to the user for use with the PE (e.g., a gel provided to allow the user to attach a PE of temporary tattoo form factor to her body).

In various embodiments, in addition to or as an alternative to applying decoration, design, and/or the like, a CVM could act to add to a PE being provisioned an indication of the portion of the PE employable in interfacing with a storage element integrated into the device. For example, a CVM could act to place text, graphics, and/or the like indicating a position for accessing an integrated RFID tag. Such placement could, for example, be performed in a manner analogous to that discussed above.

As alluded to above, in the provision of a PE, a CVM could act to provide various data to the PE's storage element (step 207). Such functionality might be performed at various stages in the PE provision process. It is noted that, in various embodiments, such action might not be required. For example, preprogrammed storage elements might be held by the CVM.

Programming of a storage element could be performed in a manner appropriate for the type of storage element. For example where the storage element is a RFID tag, an RFID tag interface could be employed by a CVM. As another example, where the storage element is an iButton, an iButton interface could be employed by the CVM. As yet another example, in the case where a barcode or dot pattern storage element is used, an appropriate printing and/or reading device could be employed.

Among data placed on a storage element by a CVM could, for example, be various data corresponding to the receipt, use, access, and/or the like of the VE to which a PE corresponded. For example, in various embodiments the VE itself could be placed on the storage element. As another example, data providing instructions and/or the like for receipt, use, access, and/or the like of the VE could be placed on the storage element. For instance, placed in the storage element could be a link (e.g., a hyperlink), a token, a key, and/or the like employable in the receipt, use, access, and/or the like of the VE.

In certain embodiments, a VE could exist on a remote server and/or the like, and a user device or the like could receive, use, access, and/or the like the VE by making use of data held in the corresponding storage element. Alternately or additionally, a VE itself could be placed on a device of the user, and the device could employ data held in the storage element in providing for the receipt, use, access, and/or the like of the VE that it held. A VE could be placed on a user device, for example, in a manner analogous to that discussed above.

Where a VE itself is placed on a user device and/or a PE's storage element, a CVM might, for example, copy the VE to its target from an internal store. As another example, the CVM might contact a remote server and/or the like that holds the VE. In various embodiments the remote server might act to provide the VE to the CVM, and the CVM could, in turn, pass the VE to the user device and/or PE storage element. As another example, the remote sever and/or the like might act to provide the VE directly to the user device and/or storage element.

Where a VE is to sit on a remote server and/or the like, and a user device or the like is to receive, use, access, and/or the like the VE by making use of data held in a corresponding storage element, a CVM could perform various operations to facilitate such behavior. For example, the CVM could interact with one or more such remote servers or the like to inform them that the PE should be employable in the receipt, use, access, and/or the like of the VE.

It is noted that, in various embodiments, certain use rules, restrictions, and/or the like could be associated with VEs. For example, an expiration date could be set for a VE such that receipt, use, access, and/or the like of the VE would be disallowed after the expiration date. As another example, restrictions could be placed on which users, which devices, the number of users, the number of devices, and/or the like that could receive, use, access, and/or the like a VE. Such functionality might be implemented in a number of ways. For example, digital rights management (DRM) techniques might be employed, user device identifiers (e.g., Bluetooth identifiers, MAC addresses, telephone numbers, and/or the like) might be employed, and/or the like.

In various embodiments, there could correlation between payment amount and VE rules, restrictions, and or the like. For instance, payment of a larger amount of funds could result in no rules, restrictions, and/or the like or fewer and/or less stringent rules, restrictions, and/or the like, while payment of a smaller amount of funds could result more and/or more stringent rules, restrictions, and/or the like. In various embodiments, one or more fee schedules correlating payment amounts and VE rules, restrictions, and/or the like could be established, created, provided, and/or the like. Such a schedule might, for instance, apply to all VEs, specified VEs, VEs meeting certain criteria, and/or the like. Such a schedule might, for example, be established, created, provided, and/or the like by a system administrator, a content provider, and/or the like.

Having performed various of the above-described operations, a CVM could, in various embodiments, act to vend a PE corresponding to a VE. Accordingly, for example, the. CVM might dispense the PE in a way typical of vending machines. As a specific example, the CVM might place the PE in a tray accessible by the user.

It is noted that, in various embodiments, a CVM could act to check a PE's storage element at some point in time before vending it. In performing the check, the CVM could, for instance, employ an appropriate interface (e.g., a RFID interface). The CVM could, for example, check to see that the storage element was functional, undamaged, and/or that it contained appropriate data for the use, access, and/or the like of a corresponding VE. In various embodiments, in the case where the storage element was non-functional, damaged, and/or such appropriate data was, for instance, not completely and/or correctly present, the CVM could act to reperform one or more of the operations discussed above. Storage element check functionality might be useful, for example, in identifying a storage element that was damaged during its incorporation and/or the like into a PE.

Figure 4:
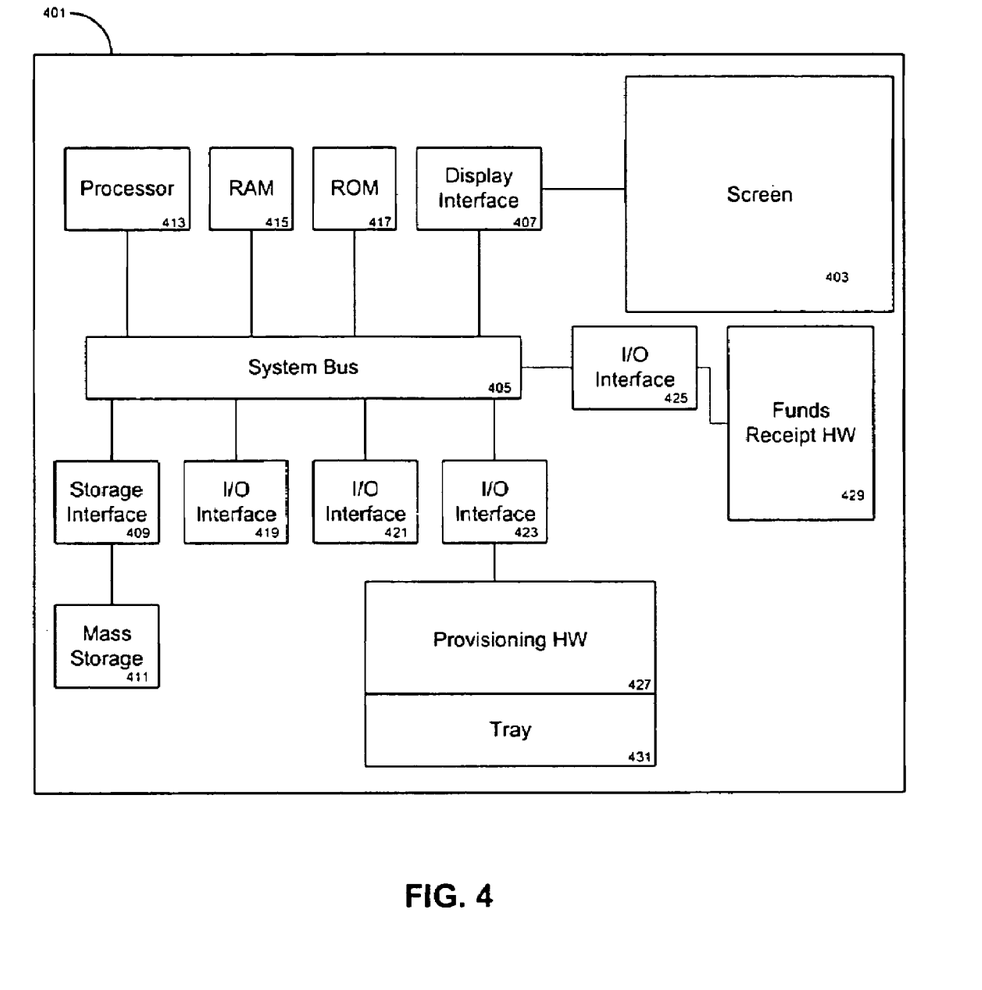
FIG. 4 shows an exemplary computerized vending machine employable in embodiments of the present invention.

Shown in FIG. 4 is an exemplary CVM of the sort described above. As shown in FIG. 4, CVM 401 includes touch-sensitive screen 403, system bus 405, display interface 407, storage interface 409, mass storage 411, processor 413, random access memory (RAM) 415, read-only memory (ROM) 417, I/O interfaces 419-425, provisioning hardware 427, funds receipt hardware 429, and PE access tray 431.

One or more of I/O interface 419 and I/O interface 421 might, for example, provide for Bluetooth, IrDA, UMTS, GPRS, 802.11b, 802.11g, ZigBee, a wired connection (e.g., Ethernet), and/or the like for purposes of, for instance, operation of the sort discussed above. Held in mass storage 411, RAM 415, and/or ROM 417 could be various data corresponding to operations of the sort discussed above. For example, held could be program code for performing various operations of the sort discussed above, and/or data corresponding to decoration, design, and/or the like, form factors, and/or the like.

As shown in FIG. 4, I/O interface 423 is disposed in communication with provisioning hardware 427. Provisioning hardware 427 could for instance, in accordance with that which is discussed above, include one or more stockpiles (e.g., of storage elements, items corresponding to various form factors, and/or the like), one or more printing apparatuses, one or more stitching machines and/or sewing machines, one or more 3-D printers, one or more storage element interfaces (e.g., RFID interfaces), and/or the like. Provisioning hardware 427 could, for example, place a PE in tray 431, perhaps as discussed above.

As also shown in FIG. 4, I/O interface 425 is disposed in communication with funds receipt hardware 429. Funds receipt hardware 429 could include, for example, coin collection hardware, bill collection hardware, a credit card and/or banking card interface (e.g., a magnetic card and/or smartcard reader), and/or the like. One or more of I/O interface 423 and 425 might, for example, provide for universal serial bus (USB), IEEE 1394, IEEE 1394b, parallel, serial, and/or other communications.

It is noted that, according to various embodiments of the present invention, a user device could act as a CVM and/or in the manner of a CVM. For instance, a user could carry one or more PEs, and/or one or more PEs could be stored near, in, and/or on the user device.

In various embodiments, the PEs might already, perhaps as discussed above, already contain data for the use, access, and/or the like of one or more VEs. Alternately or additionally, in various embodiments, the user device could employ an appropriate, perhaps integrated, interface to provide to a PE's storage element, perhaps in a manner analogous to that discussed above, data for the use, access, and/or the like of one or more VEs.

Accordingly, for instance, a user could so employ a user device to distribute to other individuals PEs corresponding to VEs. Such a user might, for example, do so in exchange for funds and/or as part of a promotion (e.g., to advertise a product, service, and/or the like).

Virtual Entity and Physical Entity Use

As alluded to above, a user could, in various embodiments, act to receive, use, access, and/or the like a VE corresponding to a PE by allowing a user device to read from and/or write to the storage element integrated in the PE.

Figure 3:
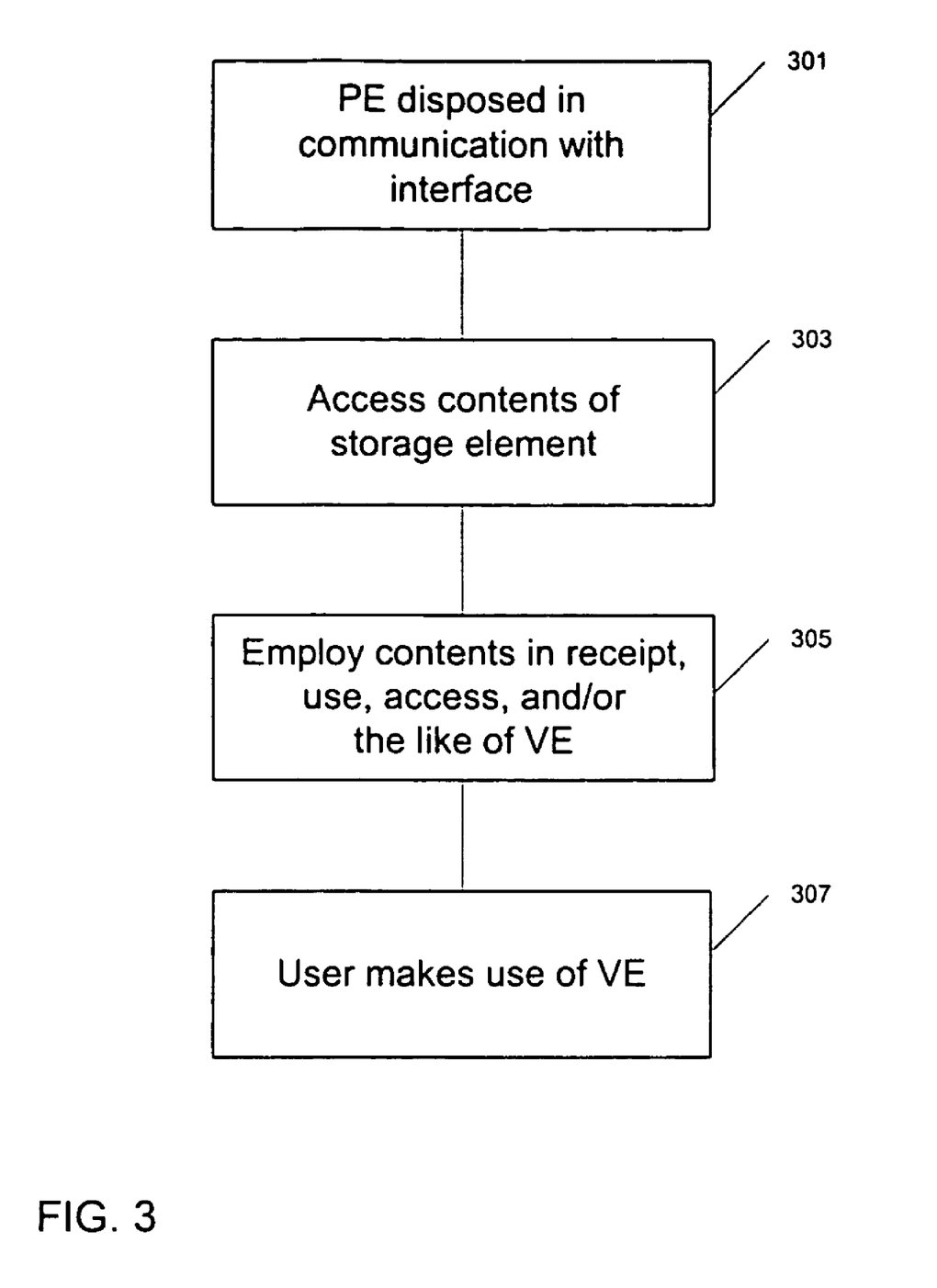
FIG. 3 is a diagram depicting exemplary steps involved in virtual entity and physical entity use according to embodiments of the present invention.

With respect to FIG. 3 it is noted that, for example, the PE could accordingly be disposed in communication with an appropriate interface (e.g., an RFID interface in the case where the storage element is an RFID tag) associated with the device (step 301). The device could then, as alluded to above, in various embodiments access the contents of the storage element (step 303). After this, the contents could, in various embodiments, be employed in allowing for the receipt, use, access, and/or the like of the VE (step 305). Accordingly, for example, the user device could employ contents of the storage element in accessing a server, remote and/or local store, and/or the like where the VE is located, and could make the VE available to its user for receipt, use, access, and/or the like. As another example, where the VE is held in the storage element, the device could allow its user to receive it, use it, access it, and/or the like.

As noted above, in various embodiments a PE could possess an indication of a location upon itself that is employable for the reading of its storage element. According a user wishing to use, receive, access, and/or the like the VE corresponding to the PE might, in various embodiments, employ the indicated location in allowing a device to read the storage element.

Having employed the PE, the user could, for example, employ her user device to make use of the corresponding VE in an appropriate manner (step 307). For example, a song VE could be listened to, a picture or film clip VE could be viewed, a service VE could be used, and/or the like.

Hardware and Software

Various operations and/or the like described herein may be executed by and/or with the help of computers. Further, for example, the user devices and/or the computerized vending machine described herein may be and/or may incorporate computers. The phrases "computer", "general purpose computer", and the like, as used herein, refer but are not limited to a processor card smart card, a media device, a personal computer, an engineering workstation, a PC, a Macintosh, a PDA, a computerized watch, a node, a wired or wireless terminal, a server, a network access point, a network multicast point, or the like, perhaps running an operating system such as OS X, Linux, Darwin, Windows CE, Windows XP, Windows Server 2003, Palm OS, Symbian OS, or the like, perhaps employing the Series 60 Platform and/or Series 90 Platform, and perhaps having support for Java and/or Net.

Figure 5:
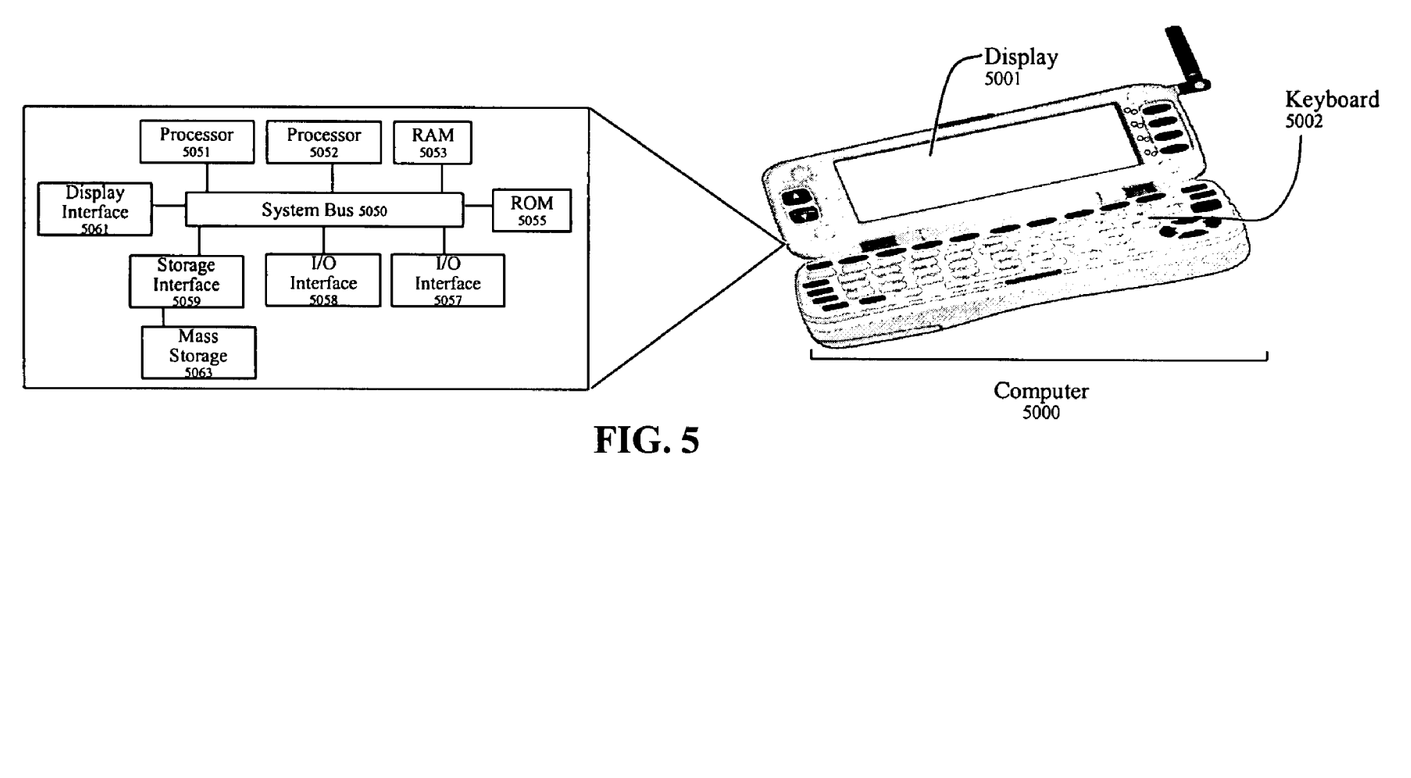
FIG. 5 shows an exemplary general purpose computer employable in embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 5000 as shown in FIG. 5 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may be an Ethernet, IEEE 1394, IEEE 1394b, IEEE 802.11a, IEEE 802.11b, IEEE 802.11g, IEEE 802.16a, IEEE 802.20, IEEE 802.15.3, ZigBee, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-H, IrDA (Infrared Data Association), or other interface known in the art.

Mass storage 5063 may be a hard drive, optical drive, or the like. Processors 5051 and 5052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, or an Intel Pentium. Computer 5000 as shown in this example also includes a touch screen 5001 and a keyboard 5002. In various embodiments, a mouse, keypad, and/or interface might alternately or additionally be employed. Computer 5000 may additionally include or be attached to card readers, DVD drives, floppy disk drives, and/or the like whereby media containing program code (e.g., for performing various operations and/or the like described herein) may be inserted for the purpose of loading the code onto the computer.

In accordance with the present invention, a computer may run one or more software modules designed to perform one or more of the above-described operations. Such modules might, for example, be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, grid computing techniques may be employed.

Figure 6:
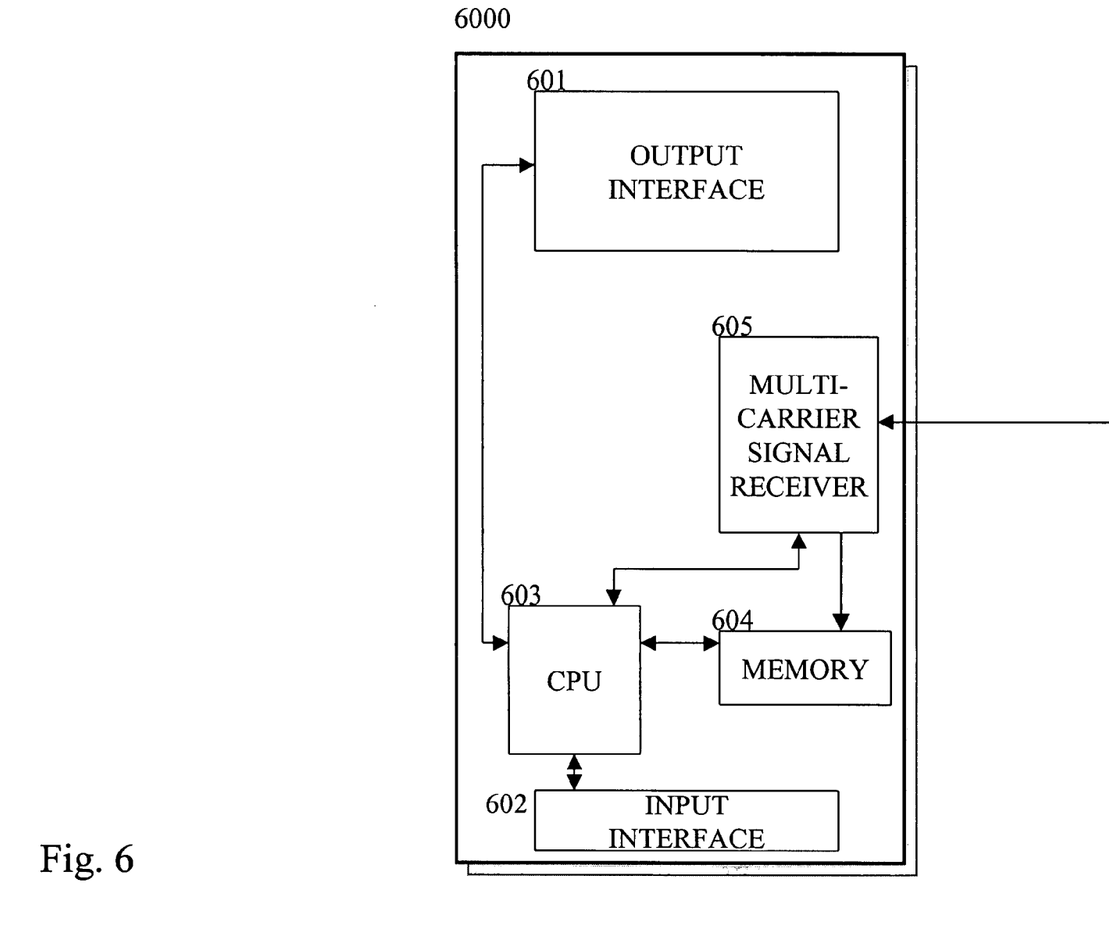
FIG. 6 shows a block diagram of an exemplary user device employable in embodiments of the present invention.

Shown in FIG. 6 is a block diagram of an exemplary terminal employable in various embodiments of the present invention. The terminal of FIG. 6 has been discussed in the foregoing. In the following, corresponding reference signs have been applied to corresponding parts. Terminal 6000 of FIG. 6 may be used in any/all of the embodiments described herein. The terminal 6000 comprises a processing unit CPU 603, a multi-carrier signal terminal part 605 and a user interface (601, 602). The multi-carrier signal terminal part 605 and the user interface (601, 602) are coupled with the processing unit CPU 603. One or more direct memory access (DMA) channels may exist between multi-carrier signal terminal part 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can be a hand-held device which the user can comfortably carry. Advantageously, the terminal 6000 can be a cellular mobile phone which comprises the multi-carrier signal terminal part 605 for receiving the multicast transmission stream. Therefore, the terminal 6000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method for facilitating virtual entity access, comprising:
    storing a storage element in a computerized vending machine;
    receiving a first selection associated with an electronic item through an input interface of the computerized vending machine;
    electronically receiving a second selection associated with a physical item through the input interface of the computerized vending machine, wherein the physical item includes the storage element;
    storing the electronic item in the storage element of the physical item in response to the received first selection and the received second selection; and
    the computerized vending machine providing the physical item, wherein the electronic item is accessible from the physical item.

2. The method of claim 1, wherein said electronic item is selected from the group consisting of at least one media item, at least one software item, at least one service item, and data.

3. The method of claim 1, wherein the electronic item stored in said storage element is employable in accessing a virtual entity.

4. The method of claim 1, wherein the electronic item includes a link pointing to a virtual entity.

5. The method of claim 1, wherein the electronic item is configured to be read by a user device.

6. The method of claim 1, wherein said storage element is a radio frequency identification tag.

7. The method of claim 4, wherein said virtual entity exists at a remote location.

8. The method of claim 4, wherein said virtual entity exists at a user device.

9. The method of claim 4, wherein said virtual entity is a media item.

10. The method of claim 4, wherein said virtual entity is a service.

11. The method of claim 1 wherein said physical item is a temporary tattoo.

12. The method of claim 1 wherein said physical item is a nail treatment.

13. The method of claim 1 wherein said physical item is jewelry.

14. The method of claim 1, further comprising receiving a third selection of one or more physical entity cosmetic attributes, wherein the physical item is provided with said cosmetic attributes.

15. The method of claim 14, wherein said cosmetic attributes include one or more designs.

16. The method of claim 14, wherein said cosmetic attributes are definable by a user.

17. The method of claim 14, wherein said cosmetic attributes are predefined.

18. The method of claim 1, wherein access restrictions are imposed for said electronic item.

19. The method of claim 1, further comprising receiving payment for said physical item.

20. The method of claim 19, wherein there is a correlation between payment amount and access restrictions imposed for said electronic item.

21. A system for facilitating virtual entity access, comprising:
    a memory having program code stored therein; and
    a processor disposed in communication with said memory for carrying out instructions in accordance with said stored program code;
    wherein said program code, when executed by said processor, causes said system to perform operations comprising:
        receiving a first selection associated with an electronic item;
        receiving a second selection associated with a physical item, wherein the physical item includes a storage element;
        storing the electronic item in the storage element of the physical item in response to the received first selection and the received second selection; and
        providing the physical item, wherein the electronic item is accessible from the physical item.

22. The system of claim 21, wherein said electronic item is selected from the group consisting of at least one media item, at least one software item, at least one service item, and data.

23. The system of claim 21, wherein the electronic item stored in said storage element is employable in accessing a virtual entity.

24. The system of claim 21, wherein the electronic item is configured to be read by a user device.

25. The system of claim 21, wherein said storage element is a radio frequency identification tag.

26. The system of claim 23, wherein said virtual entity exists at a remote location.

27. The system of claim 23, wherein said virtual entity exists at a user device.

28. The system of claim 23, wherein said virtual entity is a media item.

29. The system of claim 23, wherein said virtual entity is software.

30. The system of claim 21 wherein said physical item is a temporary tattoo.

31. The system of claim 21 wherein said physical item is a nail treatment.

32. The system of claim 21 wherein said physical item is jewelry.

33. The system of claim 14, wherein said cosmetic attributes include one or more decorations.

34. The system of claim 14, wherein said cosmetic attributes include one or more designs.

35. The system of claim, wherein said cosmetic attributes are definable by a user.

36. The system of claim 14, wherein said cosmetic attributes are predefined.

37. The system of claim 21, wherein access restrictions are imposed for said electronic item.

38. A system for facilitating virtual entity access, comprising:
   an input interface;
   a memory having program code stored therein;
   physical entity provisioning hardware; and
   a processor disposed in communication with said memory for carrying out instructions in accordance with said stored program code, wherein said processor is further disposed in communication with said physical entity provisioning hardware;
   wherein said program code, when executed by said processor, causes said system to perform operations comprising:
      receiving a first selection associated with an electronic item through the input interface;
      receiving a second selection associated with a physical item through the input interface, wherein the physical item includes a storage element; and
      storing the electronic item in the storage element of the physical item in response to the received first selection and the received second selection;
   wherein the physical entity provisioning hardware provides the physical item under control of the processor, and the electronic item is accessible from the physical item.

39. An article of manufacture comprising a computer readable medium containing program code that when executed causes a computerized vending machine to perform operations comprising:
   receiving a first selection associated with an electronic item through an input interface;
   receiving a second selection associated with a physical item through the input interface, wherein the physical item includes a storage element;
   storing the electronic item in the storage element of the physical item in response to the received first selection and the received second selection; and
   providing the physical item, wherein the electronic item is accessible from the physical item.

40. The method of claim 14, wherein said cosmetic attributes include one or more decorations.

41. The system of claim 21, further comprising receiving a third selection of one or more physical entity cosmetic attributes, wherein the physical item is provided with said cosmetic attributes.

42. The system of claim 38, further comprising receiving a third selection of one or more physical entity cosmetic attributes, wherein the physical item is provided with said cosmetic attributes.

43. The system of claim 39, further comprising receiving a third selection of one or more physical entity cosmetic attributes, wherein the physical item is provided with said cosmetic attributes.

44. An apparatus comprising:
   means for receiving a first selection associated with an electronic item;
   means for electronically receiving a second selection associated with a physical item, wherein the physical item includes a storage element;
   means for storing the electronic item in the storage element of the physical item in response to the received first selection and the received second selection; and
   means for providing the physical item, wherein the electronic item is accessible from the physical item.

* * * * *